April 7, 1953 O. V. GASSER ET AL 2,633,876
BOB PIN MACHINE
Filed April 21, 1949 13 Sheets-Sheet 1

Fig.1

Inventors:
Oswald V. Gasser
and Douglas C. Evans,
By Dawson, Ooms, Booth & Spangenberg,
Attorneys.

April 7, 1953 O. V. GASSER ET AL 2,633,876
BOB PIN MACHINE
Filed April 21, 1949 13 Sheets-Sheet 2

Inventors:
Oswald V. Gasser
and Douglas C. Evans,
By Dawson, Ooms, Booth and Spangenberg,
Attorneys.

April 7, 1953  O. V. GASSER ET AL  2,633,876
BOB PIN MACHINE

Filed April 21, 1949  13 Sheets-Sheet 4

Inventors:
Oswald V. Gasser
and Douglas E. Evans,
By Dawson, Ornes, Booth and Spangenberg,
Attorneys.

April 7, 1953 O. V. GASSER ET AL 2,633,876
BOB PIN MACHINE
Filed April 21, 1949 13 Sheets-Sheet 6

Inventors:
Oswald V. Gasser
and Douglas C. Evans,
By Dawson, Ooms, Booth & Spangenberg,
Attorneys.

April 7, 1953

O. V. GASSER ET AL 2,633,876

BOB PIN MACHINE

Filed April 21, 1949

Inventors:
Oswald V. Gasser
and Douglas E. Evans,

By Dawson, Ornus, Borth and Spangenberg,
Attorneys.

April 7, 1953     O. V. GASSER ET AL     2,633,876
BOB PIN MACHINE Filed April 21, 1949                                 13 Sheets—Sheet 11

Inventors:
Oswald V. Gasser
and Douglas C. Evans,
By Dawson, Orme, Brothers & Spangenberg,
Attorneys.

Patented Apr. 7, 1953

2,633,876

UNITED STATES PATENT OFFICE 2,633,876

BOB PIN MACHINE

Oswald V. Gasser and Douglas C. Evans,
Appleton, Wis.

Application April 21, 1949, Serial No. 88,798

7 Claims. (Cl. 140—87)

This invention relates to the manufacture of bob pins.

There are several methods of manufacturing bob pins, one of which comprises generally, forming wire to proper cross sectional dimensions, cutting the wire to proper lengths, forming open bob pins therefrom, painting and drying the open bob pins, closing the bob pins into final shape, tempering the closed bob pins, and carding the closed bob pins by placing groups of them on merchandise cards for merchandising purposes. Bob pins thus formed usually have one leg longer than the other to facilitate manipulation in use and, if desired, one or both legs may be crimped. The advantage of painting bob pins while they are open rather than closed is that the formation of globs of paint thereon is prevented, thereby minimizing chipping and peeling of the paint and catching and breaking the end of hair during use.

However, there are several disadvantages attendant upon such a method of manufacturing bob pins. The open bob pins become disarranged, tangled and interlocked and a great deal of time and manufacturing expense is required to untangle and arrange the open bob pins before they may be closed. The closed bob pins also become disarranged and they must be rearranged before carding which is also time consuming and expensive. In addition, the closed bob pins must be counted while placing them on the merchandise cards.

The principal object of this invention is to eliminate the foregoing disadvantages in such a method of manufacturing bob pins. In this connection, this invention contemplates a machine for automatically sorting, arranging and closing bob pins and maintaining control over the bob pins throughout such operations.

The machine includes means for separating and sorting the open bob pins, preferably a tumbling cylinder for discharging the open bob pins through a tortuous passage to a feed trough.

The machine also includes means for arranging the open bob pins with the long legs thereof on one side. In this connection, there is preferably utilized a feed rail to which open bob pins are fed one or more at a time from the trough, a pair of arranging rails for receiving open bob pins from the feed rail and a device cooperating with the long legs of the bob pins for suspending open bob pins on one arranging rail with the long legs on one side and for suspending open bob pins on the other arranging rail with the long legs on the other side.

The machine further includes means for closing the arranged bob pins and, preferably, there is provided a pair of intermittently operated closing jaws associated with each arranging rail for closing the bob pins advanced thereto and a screw operated in time relation with the closing jaws for advancing open bob pins one at a time from the arranging rail to the associated closing jaws to be closed thereby. Preferably, a tin is associated with each pair of closing jaws upon which the bob pins are closed and clamped and means operated in timed relation with the closing jaws for advancing the tin with the bob pins closed thereon. Preferably, the tin is recurrently advanced by a predetermined number of small increments of movement to provide a measured group of closely arranged bob pins thereon and by a large increment of movement to provide a plurality of spaced measured groups of bob pins there. The machine is adjustable to regulate the number of pins in a group and the spacing between groups. The spaced measured groups of bob pins thus closed on the tin, preferably, correspond to the grouping and spacing of the bob pins on the merchandise card so that after tempering they may be readily applied to the merchandise cards without arranging, counting, etc.

The machine of this invention therefore receives open bob pins in the bulk and automatically sorts, arranges and closes the bob pins on tins in spaced measured groups so that they may be readily applied to merchandise cards with a minimum of effort. During these operations the machine maintains control and dominion over the bob pins so that the operation is substantially completely automatic and foolproof. It affords a great saving in time and manufacturing expense.

A further object of this invention is to provide, as an article of manufacture, an arrangement of bob pins comprising an elongated tin and a plurality of spaced groups of bob pins closed thereon which is particularly useful in connection with carding bob pins.

Other objects of this invention reside in the details of construction of the machine and the cooperative relationship between the component parts thereof.

Further objects and advantages of this invention will become apparent to those skilled in the art upon reference to the accompanying specification, claims and drawings in which:

Figure 1:
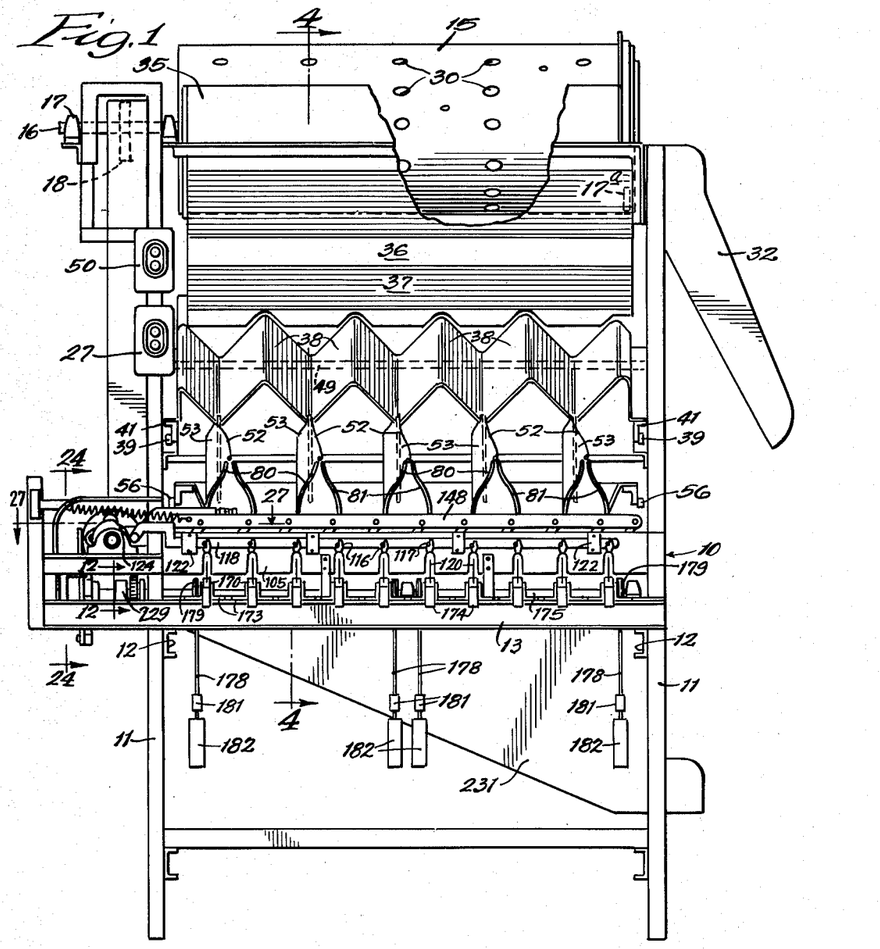
Figure 1 is a front elevational view of the machine of this invention.
Figures 2, 3:
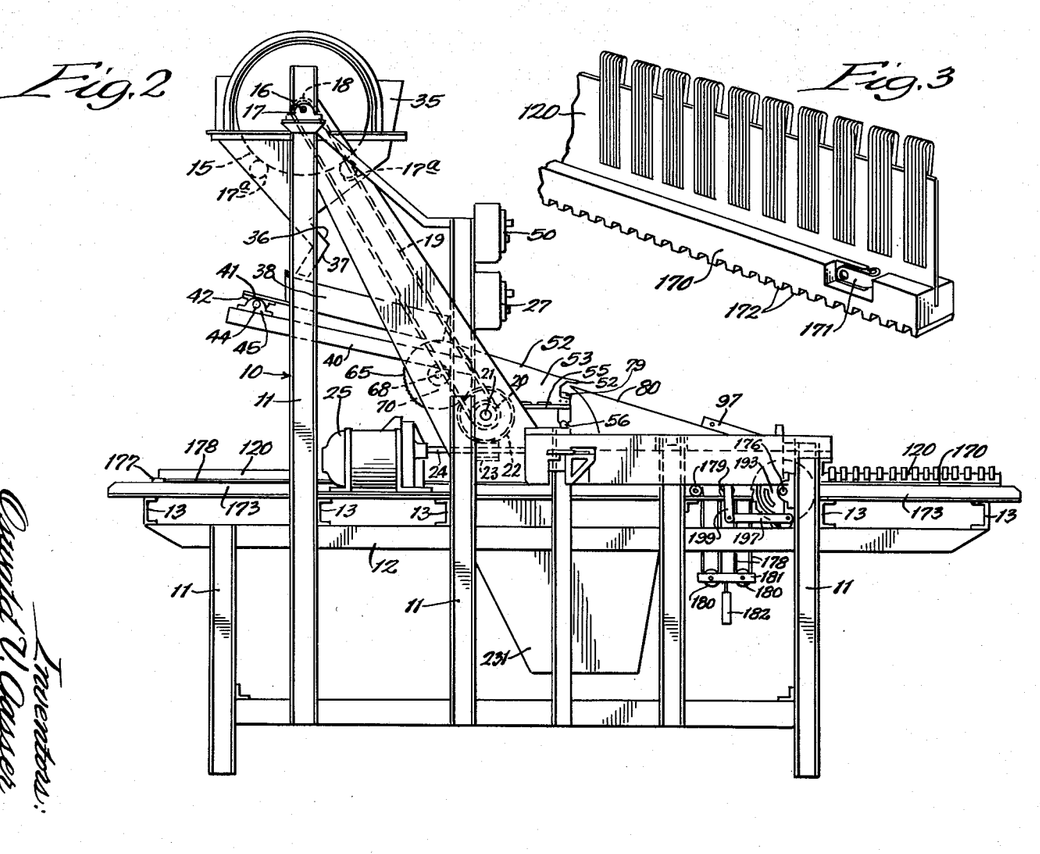
Figure 2 is a side elevational view looking from the left in Figure 1.
Figure 3 is a perspective view of a bob pin assembly including bob pins and a tin carried by a rack.
Figures 4, 5:
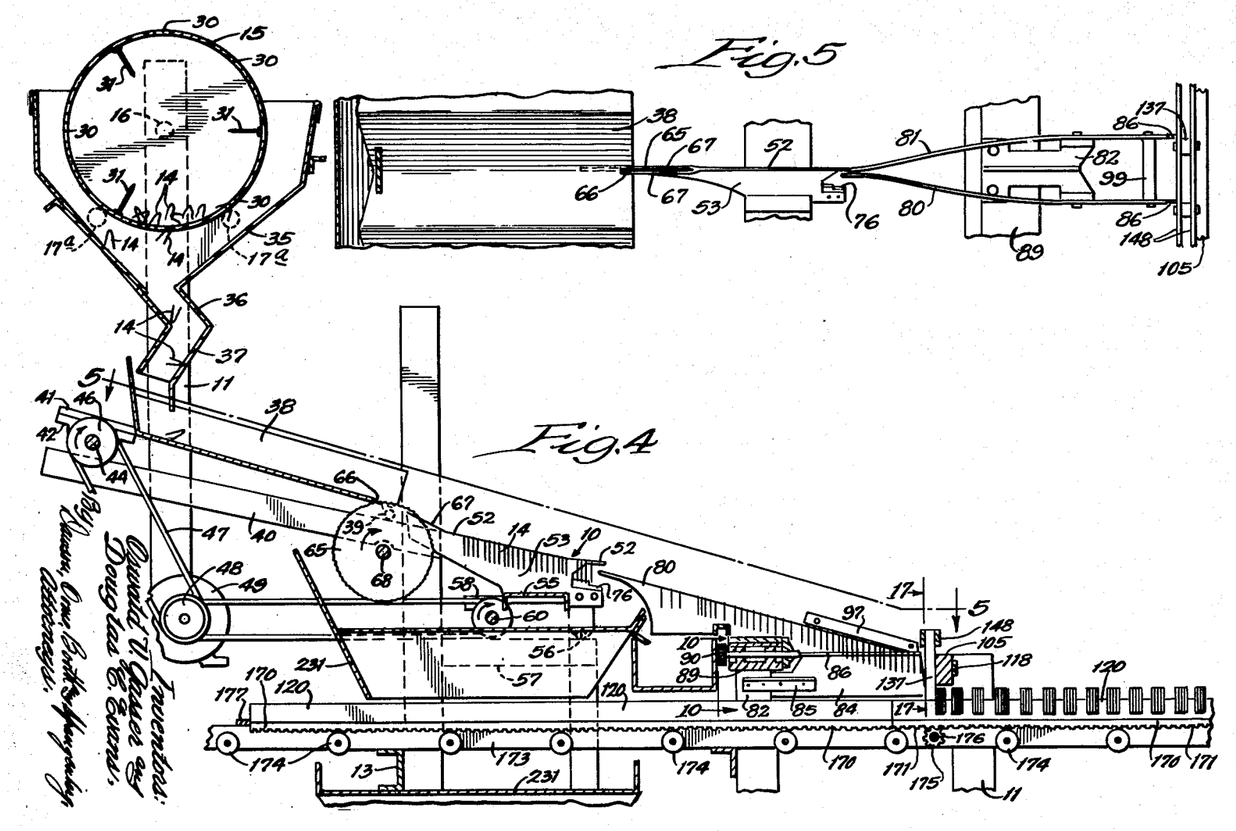
Figure 4 is a vertical sectional view taken substantially along the line 4—4 of Figure 1.
Figure 5 is a horizontal sectional view taken substantially along the line 5—5 of Figure 4.

Referring first to Figures 1, 2 and 4, the bob pin machine is generally designated at 10 and it includes a frame work having a plurality of uprights 11, a bed 12 and cross members 13, all suitably secured together to form a rigid frame. One pair of uprights 11 rotatably carries a tumbling cylinder 15 by means of a shaft 16 suitably journaled in bearings 17 and by rollers 17ᵃ. For rotating the tumbling barrel 17, the shaft 16 carries a sprocket wheel 18 (Fig. 29) connected by a chain 19 to a sprocket wheel 20 carried by a shaft 21. The shaft 21 carries a worm wheel 22 meshing with a worm 23 carried by a shaft 24 driven by a motor 25 having a gear reducer therein and suitably carried by the supporting frame. A clutch 26 may be interposed between the sprocket wheel 18 and the tumbling cylinder 15 and the motor may be controlled by a suitable stop and start switch 27 carried by the frame work. The clutch 26 may be operated by a suitable shaft lever (not shown) extending down along the side of the machine.

Figure 6:
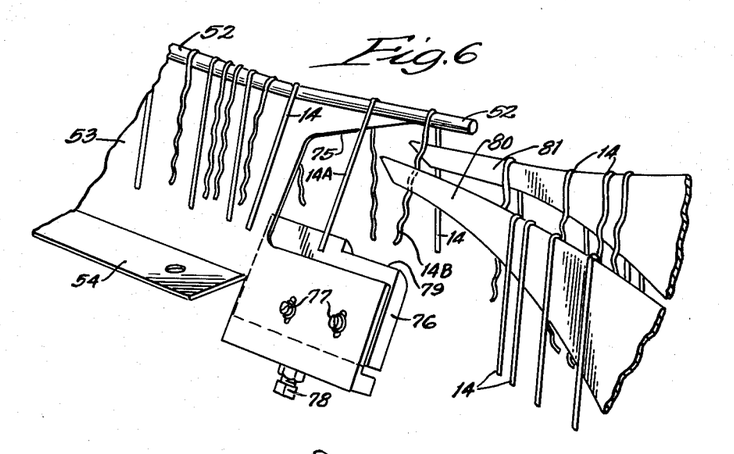
Figure 6 is an enlarged perspective view illustrating the cooperative relationship between the feed rail and the arranging rails.

The rotating cylindrical tumbler is utilized for the purpose of separating, untangling and unlocking open bob pins 14 inserted therein in the bulk. Such open bob pins 14 are illustrated in Figure 6. In this connection, the tumbling cylinder 15 is provided with a series of peripheral openings 30 through which the open bob pins may pass one or more at a time as is illustrated in Figure 4. The inside of the tumbling cylinder may be provided with suitable projections or pins 31 for agitating the open bob pins as the tumbling cylinder is rotated, whereby feeding of the bob pins through the peripheral holes 30 is facilitated. A pivoted trough 32 communicating with the open end of the tumbler may be utilized for loading bob pins into the tumbler.

The open bob pins discharged from the tumbling cylinder 15 are received in a hopper 35 and fall by gravity through a tortuous passage 36 and 37 into a plurality of sloping troughs 38. If any bob pins discharged from the rotating tumbling cylinder should still be interlocked or tangled, they will be separated by the tortuous passage 36, 37 so that they are supplied to the sloping troughs 38.

Figure 29:
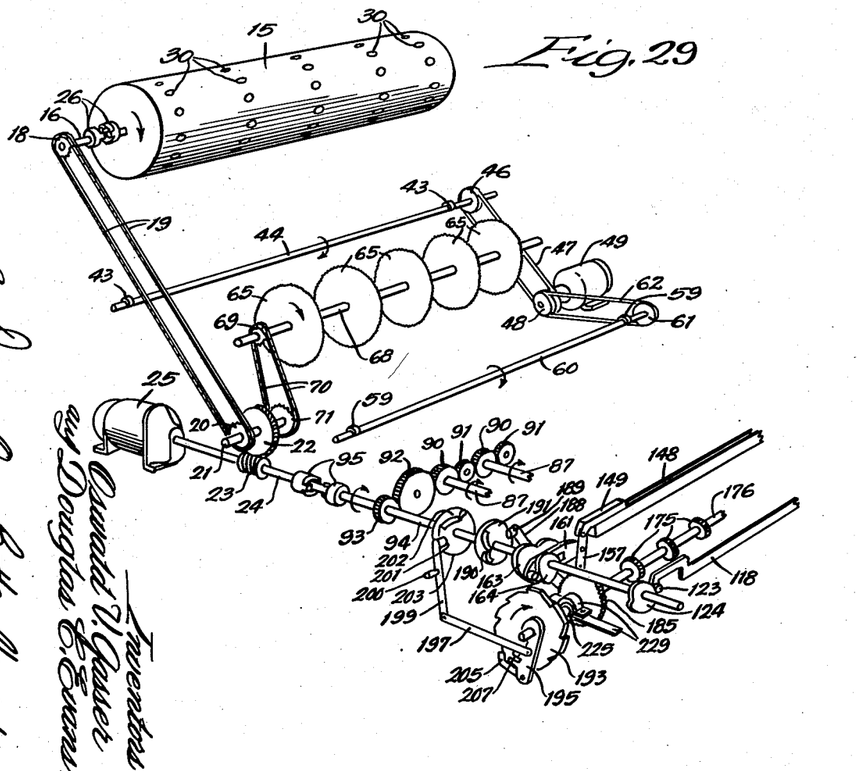
Figure 29 is a diagrammatic illustration showing the relationship between the operating parts of the machine.
Figure 30:
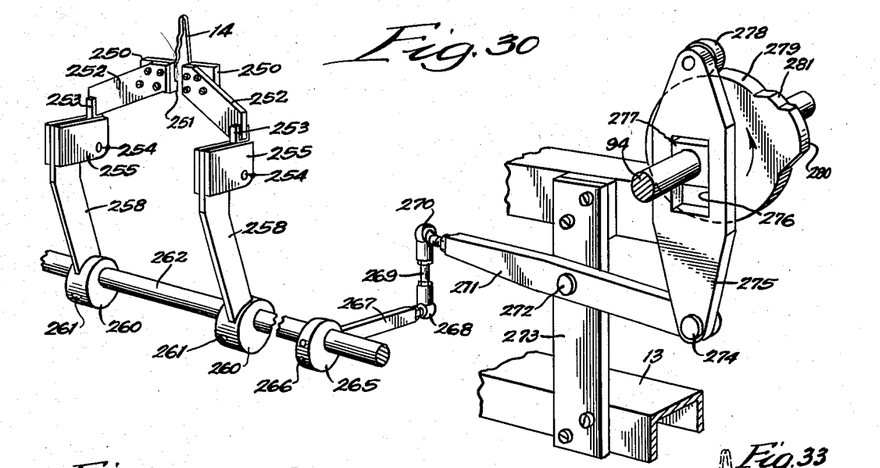
Figure 30 is a perspective view showing the holding fingers and the mechanism for operating the same which may be utilized in the machine.

The open bob pins are adapted to slide down the sloping troughs 38 and to assist the even movement of the bob pins, the troughs 38 are preferably vibrated. In this connection, the lower ends of the troughs are provided with rollers 39 rolling on supports 40. The upper end of the troughs are provided with etxensions 41 (Fig. 28) carrying journal blocks 42 for receiving eccentrics 43 carried by a transverse shaft 44, the shaft being journaled in bearing 45 carried by the supports 40. The shaft 44 carries a pulley 46 which is connected by a belt 47 to a pulley 48 driven by a motor 49 as is illustrated in Figures 4 and 29. The motor 49 is suitably carried by the supporting frame work and may be controlled by a sto-start switch 50 also carried by the frame work. In this way the troughs 38 are given a combined oscillating and reciprocating motion for moving the open bob pins gradually downwardly along the troughs. In this connection the shaft 44 is rotated in a clockwise direction as illustrated in Figure 4 so that the proper motion is imparted to the troughs and the bob pins.

Each of the troughs 38 discharge the open bob pins onto a feed rail 52 in a manner to be pointed out in more detail hereafter. The open bob pins are suspended on the feed rail 52 and move downwardly therealong. One side of the feed rail 52 slants outwardly as at 53 (Figs. 1, 5, 6 and 7) so that as the open bob pins are advanced along the feed rail they are held out of balance. The feed rail 52 is carried by a flange 54 which is secured to a table 55, the forward end of which carries rollers 56 rolling on supports 57. The rear end of the table 55 carries journal blocks 58 for receiving the eccentrics 59 (Fig. 29) carried by a transverse shaft 60. The shaft 60 is rotated in a clockwise direction as viewed in Fig. 4 by a pulley 61, a belt 62 and the pulley 48 driven by the motor 49. Thus, a combined oscillating and reciprocating motion is imparted to the feed rail 52 for gradually moving the suspended open bob pins downwardly therealong. Each trough 38 and associated feed rail 52 is provided with a serrated wheel 65 therebetween, the wheels 65 extending into the troughs through slots 66 and extending between bifurcated ends 67 of the feed rail 52. The serrated wheels 65 are driven in a clockwise direction as viewed in Fig. 4 to transfer open bob pins one or more at a time from the troughs 38 to the feed rails 52. This is accomplished by the teeth of the wheels picking up one or more bob pins at a time from the trough and suspending it on the feed rail. The shaft 68 is driven by a sprocket wheel 69, a chain 70 and a sprocket wheel 71 carried by the shaft 21 (Fig. 29). The shaft is suitably journaled in the supporting frame.

The lower end of each feed rail 52 is cut out at 75 as shown in Fig. 6. The cut out portion is provided with a directing block 76 which is adjustably secured to the feed rail assembly by screws 77. The directing block may be suitably positioned by a positioning screw 78. The directing block is provided with an edge 79 located at a predetermined distance from the top of the feed rail 52. This distance is less than the length of the long legs of the bob pin and greater than the length of the short legs thereof. Thus, those bob pins 14A which have their long legs retained by the edge 79 are maintained in an unbalanced or tilted position until they ride off the end of the block 76. However, those bob pins 14B which have their long legs on the other side are freed to swing to a balanced position as soon as they are advanced to the directing edge 79.

A pair of arranging rails 80 and 81 extend underneath the lower end of the feed rail 52 and by reason of the operation of the directing block 76 on the long legs of the bob pins, those bob pins 14A having their long legs on one side fall onto the arranging rail 80 while the other bob pins 14B having their long legs on the other side fall onto the arranging rail 81. In this way the bob pins are sorted and supplied to the arranging rails 80 and 81 with the bob pins on the arranging rail 80 having their long legs on one side while the bob pins on the arranging rail 81 have their long legs on the other side. Thus, the bob pins on the arranging rails 80 and 81 are each sorted and arranged thereon. The arranged open bob pins move downwardly along the arranging rails 80 and 81 by gravity. The arranging rails 80 and 81 are suitably supported on the member 82.

Figure 10:
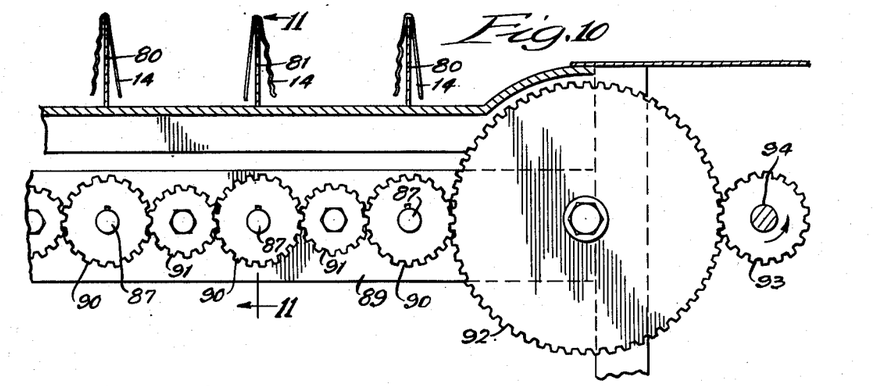
Figure 10 is a vertical sectional view taken substantially along the line 10—10 of Figure 4.

Located below each arranging rail is a plate 84 carried through brackets 85 by the support 82. The top of the plate 84 and the bottom of the arranging rail is grooved for receiving a shaft 86 which is provided with screw threads at its forward end. The shaft 86 is carried by a sleeve 87 journaled in bearings 88 carried by a support 89. The sleeves 87 are provided with driving gears 90 interconnected by idler gears 91 (Fig. 10). Since all of the gears 90 are interconnected by idlers 91 all of the shafts 86 are rotated in the same direction. The gears 90 are driven through a large idler gear 92 by a gear 93 carried by a shaft 94 which is connected by a clutch 95 (Fig. 29) to the shaft 24 to be rotated by the motor 25.

Figures 7, 8, 9:
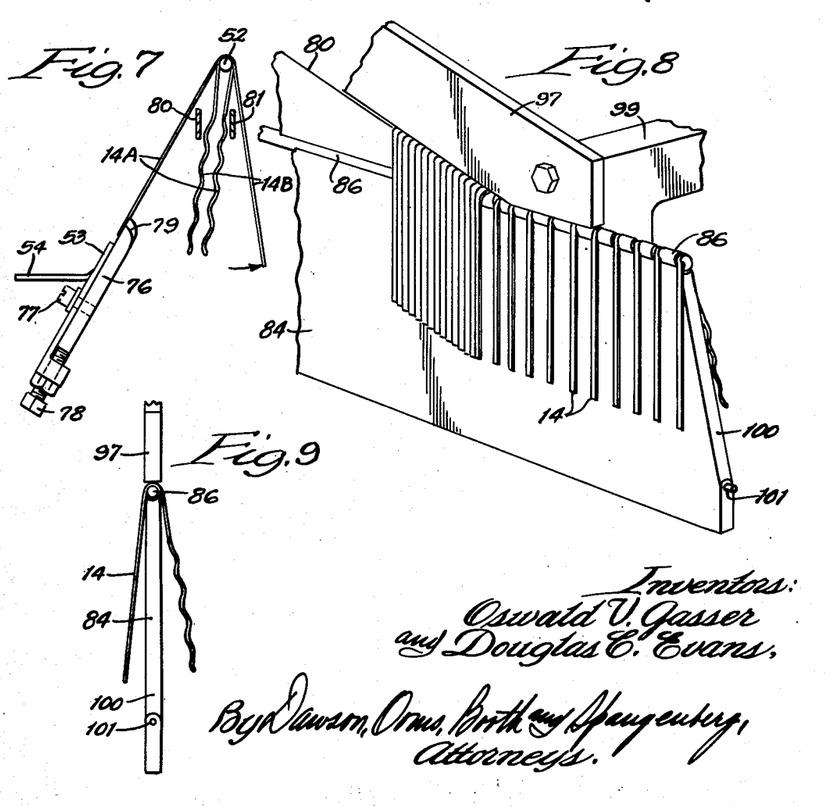
Figure 7 is a vertical sectional view taken through Figure 6 and looking from the right of Figure 6.
Figure 8 is a perspective view illustrating the manner in which bob pins are fed from the arranging rails to the closing jaws.
Figure 9 is an end elevational view looking from the right in Figure 8.
Figure 11:
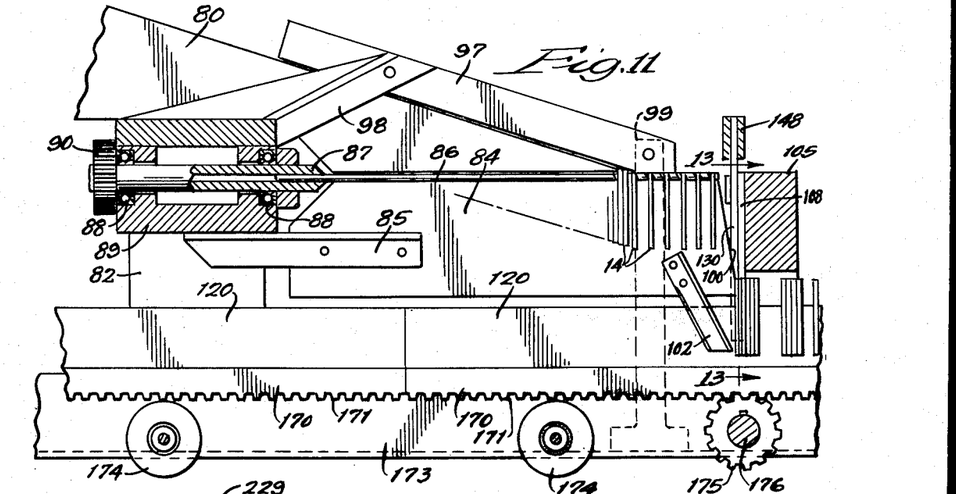
Figure 11 is a vertical sectional view taken substantially along the line 11—11 of Figure 10.

The forward ends of the arranging rails 80 and 81 terminate short of the shaft 86 so that as the open bob pins slide off the ends of the arranging rails they are advanced one at a time by the screw threads on the shaft 86 as is illustrated in Figures 8, 9 and 11. To insure that the open bob pins are fed properly to the screw, a plate 97 overlies the bottom portion of the arranging rails and a portion of the screws, thereby maintaining the bob pins in engagement with the screws and feeding properly the same to the screw. The plate 97 is held in place by suitable brackets 98 and 99.

The forward end of each plate 84 is provided with a slope 100 and near the bottom thereof there is provided a projecting pin 101. As the bob pins are advanced by the screw 86 and are forced off the end thereof they slide down the surface 100 onto the pin 101. Guides 102 carried by the plate 84 operate to center the bob pins on the pins 101.

When a bob pin slides onto the pin 101 it is located between a pair of closing jaws and is prevented from sliding off the pin by means of a movable gate mechanism.

Figures 13, 14, 15, 16:
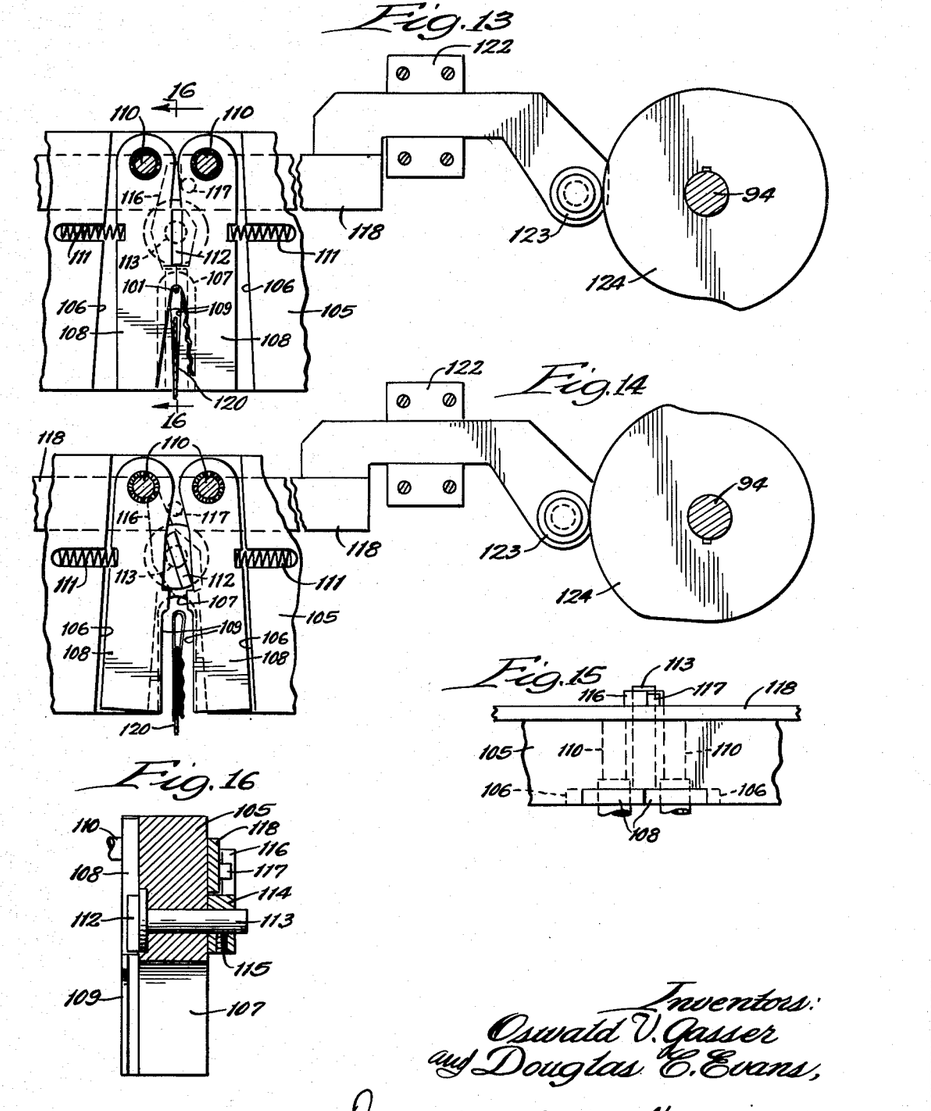
Figure 13 is a vertical sectional view taken substantially along the line 13—13 of Figure 11 and illustrating the construction and operation of the gate.
Figure 14 is a view similar to Figure 13, but showing the parts in a different operative position.
Figure 15 is a partial plan view of the gate mechanism illustrated in Figure 13.
Figure 16 is a vertical sectional view taken along the line 16—16 of Figure 13.

The gate mechanism is illustrated in Figs. 11 and 13 to 16 and comprises a transverse supporting bar 105 which is provided at intervals with recesses 106, the recesses being in alignment with each arranging rail. The bar 105 is also provided with a plurality of spaced openings 107 to allow the bob pins after being closed to pass therethrough. Mounted within each recess is a pair of gates 108 having cooperating faces 109, the gates being carried by the pins 110 carried by the bar 105. Springs 111 engaging the gates 108 normally maintain them closed. A cam 112 interposed between the gates 108 operates to separate the gates against the action of the springs. The cam 112 is carried by a pin 113 extending through the bar 105 and the forward end of the pin 113 is provided with a collar 114, held in place by a set screw 115, which in turn is provided with a cam 116 to be engaged by a pin 117 carried by a slidable bar 118. When the bar is moved in one direction as illustrated in Fig. 13, the springs 111 close the gates 108 and when moved to the other position, as illustrated in Fig. 14, the cams 112 operated thereby open the gates against the action of the springs. When the gates are closed as illustrated in Fig. 13, it is impossible for an open bob pin to pass therebetween and as a result the bob pins are held onto the pins 101. When the gates are closed they are adapted to accommodate a tin or receiving member 120 upon which the bob pins are adapted to be closed and clamped, the tin being a strip of sheet metal about two feet long. When a bob pin is closed upon the tin and the gates 108 are opened as illustrated in Fig. 14, the closed bob pin on the tin is permitted to advance between the gates.

The bar 118 for simultaneously opening all of the gates is journaled for sliding movement in bearings 122 and one end of the bar is provided with a roller 123 engaging a cam 124 carried by the shaft 94. Thus, the gates 108 are opened and closed in timed relation with the operation of the screws 86.

Figure 17:
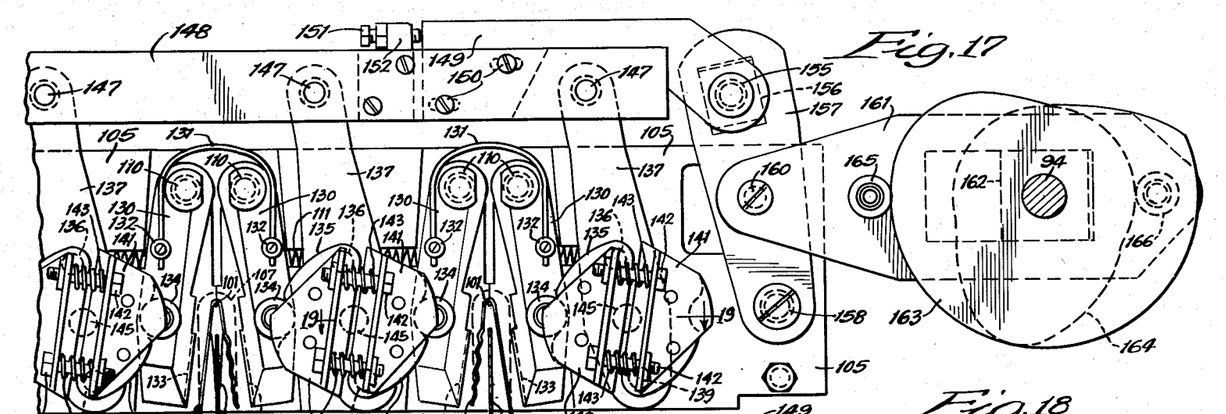
Figure 17 is a vertical sectional view taken substantially along the line 17—17 of Figure 4 and illustrating the construction and mode of operation of the closing jaws.
Figure 18:
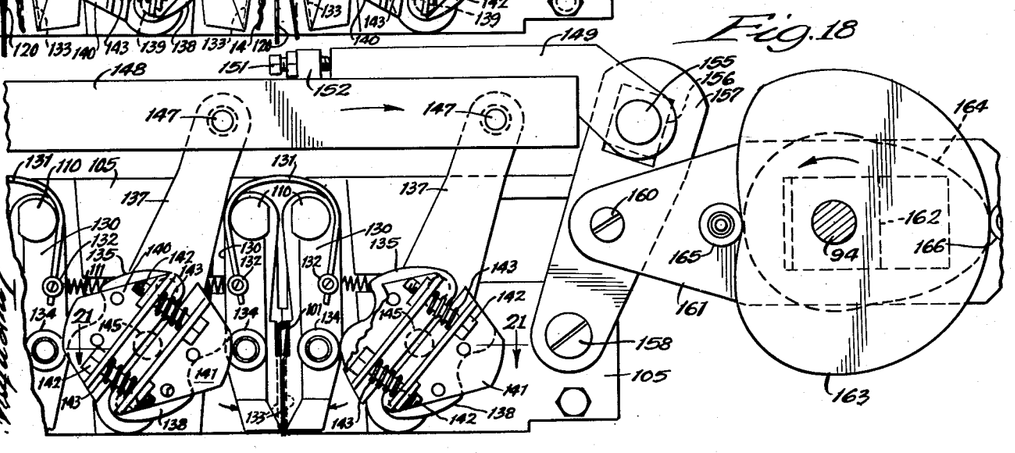
Figure 18 is a view similar to Figure 17 but illustrating the parts in a different operative position.
Figure 21:
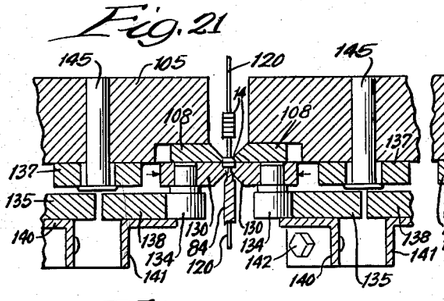
Figure 22:
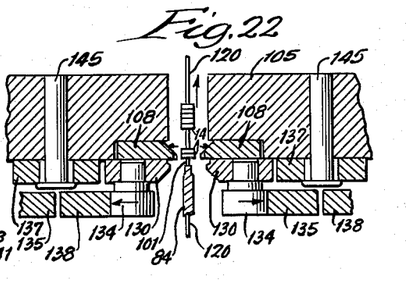
Figure 23:
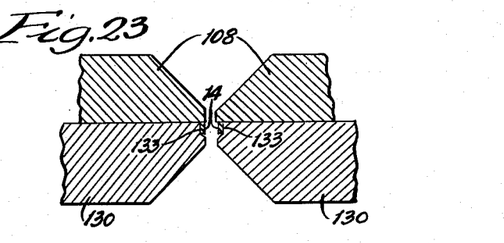
Figure 23 is an enlarged sectional view through the closing jaws and gates illustrating the details of construction of the operating surfaces.
Figures 24, 25, 26:
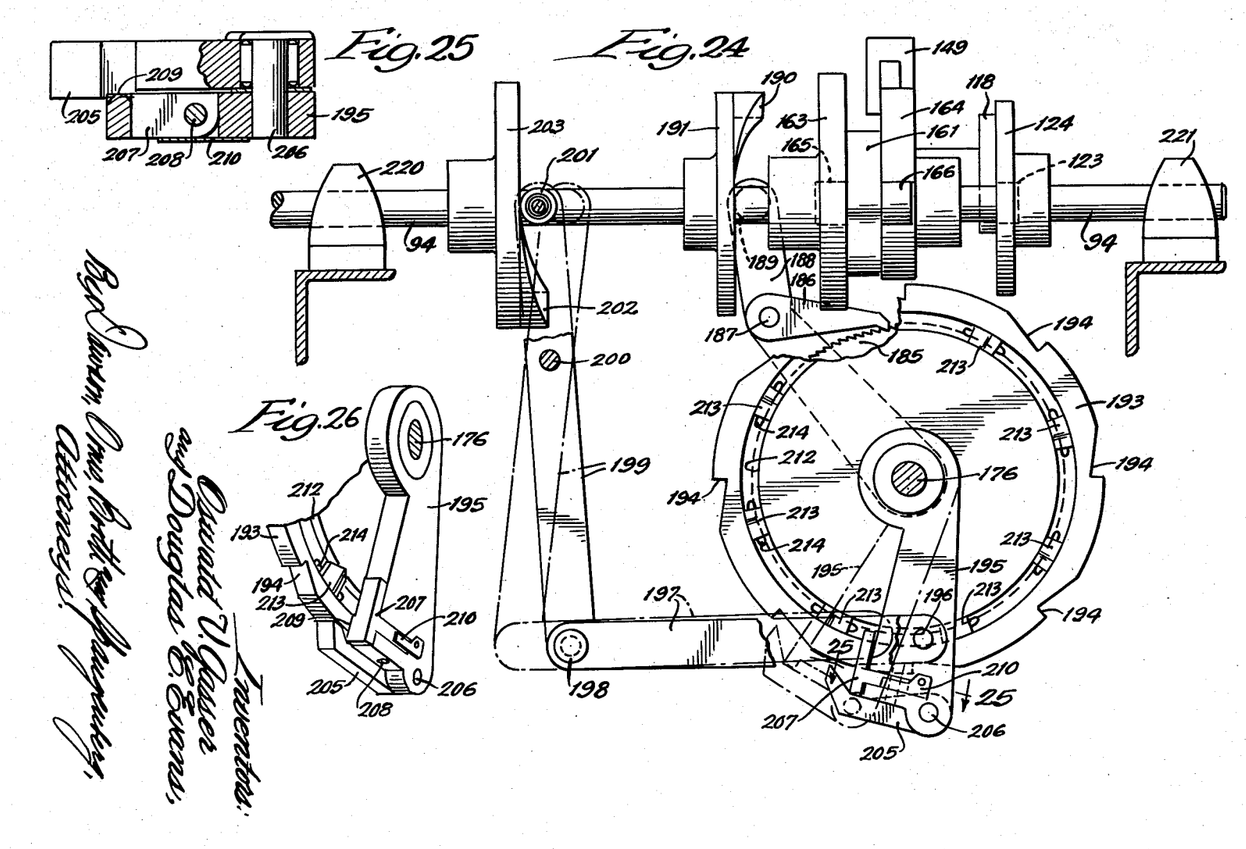
Figure 24 is a vertical sectional view taken substantially along the line 24—24 of Figure 1 and illustrating the mechanism for advancing the tins.
Figure 25 is an enlarged sectional view taken substantially along the line 25—25 of Figure 24.
Figure 26 is a perspective view of one of the pawl and ratchet mechanisms illustrated in Figure 24.

Overlying the pins 101 and located between the gates 108 and the plates 84 are a plurality of pairs of closing jaws 130, these jaws being pivoted to the same pins 110 as the gates 108 (Figs. 17 to 23). The closing jaws 130 are normally maintained opened by means of springs 131 connected between pins 132 on the jaws. The closing jaws 130 are provided with complementary closing surfaces 133 for the purpose of closing open bob pins onto the tins 120. The edges of the closing surfaces 133, as illustrated in Figure 23, are beveled to insure vertical arrangement of the bob pins as they are being closed by the closing jaws. Figure 17 illustrates the closing jaws opened with bob pins suspended therebetween by the pins 101 and Figure 18 shows the closing jaws closed for closing the bob pins upon the tins 120.

Each closing jaw is provided with a roller 134 for operating the same against the action of the springs 131. The roller 134 on one jaw is adapted to be operated by a cam 135 pivoted at its upper end at 136 to a lever 137. The roller 134 on the other jaw is adapted to be acted upon by a cam 138 pivoted at its lower end 139 to the lever 137. The cams 135 each carry an annular plate 140 and the cams 138 each carry an annular plate 141, the plates being held together by bolts 142 and interposed springs 143. The plates, bolts and springs operate to maintain the cams 135 and 138 in predetermined positions with respect to each other so that the various closing jaws may be properly operated. At the same time the springs 143 provide a strain release connection to prevent damage to the jaws in the event that the bob pins should not be properly located therebetween. The levers 137 carrying the cams 135 and 138 for operating the jaws 130 are each pivoted for operation upon a pin 145 carried by the transverse bar 105. The upper ends of the levers 137 are pivoted at 147 to a bar 148 so that upon oscillation of the bar 148 the closing jaws 130 are operated. The bolts 142 connecting the annular plates 140 and 141 provide a means for adjusting the operation of the closing jaws 130 so that each closing jaw may be adjusted for proper operation upon oscillation of the bar 148.

The end of the bar 148 adjustably carries an arm 149 by means of screws 150. The arm 149 may be longitudinally adjusted with respect to the bar 148 by an adjusting screw 151 carried by a bracket 152 on the bar 148. The arm 149 is pivoted at 155 to a block 156 slidably mounted to one end of a lever 157, the other end of which is pivoted at 158 to the transverse bar 105. The lever 157 is connected intermediate its ends by a pivot 160 to a link 161 which is slidably journaled on a block 162 rotatably mounted on the shaft 94. The shaft 94 carries on opposite sides of the block 162 cams 163 and 164. The cam 163 operates against a roller 165 carried by the link 161 and the cam 164 operates against a roller 166 also carried by the link 161. Thus, as the shaft 94 is rotated the cams 163 and 164 impart motion through the link 161 and the lever 157 to the bar 148 for operating the closing jaws 130. In this way the closing jaws are operated in time relation with the screws 86 and the gates 108.

Figure 19:
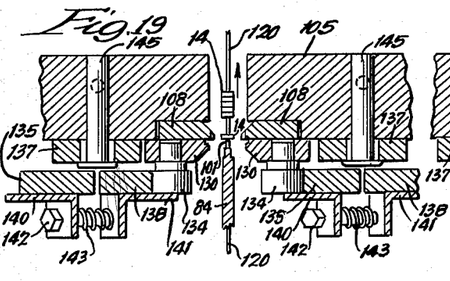
Figures 19, 20, 21 and 22 are horizontal sectional views taken substantially along the line 19—19 of Figure 17 and illustrating the sequence of operation of the gates and closing jaws.
Figure 20:
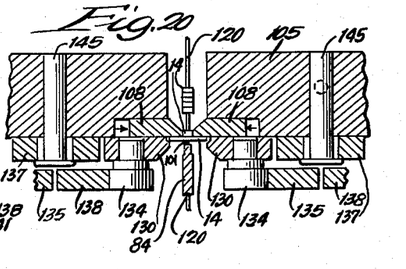

The sequence of operation of the screws, gates and jaws is illustrated in Figures 19 to 22. In Figure 19, a bob pin 14 has been closed upon the tin 120. The tin has been advanced a distance equal to the width of a bob pin to remove the closed bob pin 14 from the pin 101. The gates 108 and the jaws 130 are open to permit the advance of the tin. In Figure 20 the gates 108 have been closed with the bob pin 14 located therebetween. The jaws 130 are open and an open bob pin 14 has been supplied to the pin 101 by the screw 86. The gates 108 being closed hold the open bob pin on the pin 101. In Figure 21 the closing jaws 130 have been closed, to close the open bob pin upon the tin 120. In Figure 22 the closing jaws 130 and the gates 108 have been opened and the tin 120 has been advanced for another cycle of operation.

The tins 120 are advanced with respect to the closing jaws and gates by means of racks 170 (Fig. 3) provided with longitudinal grooves for receiving the tins. The tins 120 are held in place in the grooves by spring clips 171. The bottom of the racks are provided with rack teeth 172 and the racks are of the same length as the tins. The racks 170 are guided by the angle irons 173 carried by the cross members 13. Rollers 174 are located between the angle irons 173 for supporting the racks 170 as they are advanced lengthwise through the machine. The racks are advanced by gears 175 meshing with the rack teeth 172 and carried by a transverse shaft 176. Thus, as the shaft 176 is intermittently rotated the racks in engagement therewith are intermittently advanced. A plurality of racks are retained in each guide channel and they are urged forward by means of a pair of bars 177 at the rear of the machine. The bars 177 are connected by cables 178 over pulleys 179 and 180 to a block 181 carrying weights 182. Thus, the racks are all urged forwardly and the forward motion thereof is limited and controlled by the intermittent rotation of the shaft 176.

The transverse shaft 176 is journaled in suitable bearing 174 and is intermittently operated by a timing mechanism illustrated in detail in Figures 24 to 27. The timing mechanism includes a ratchet wheel 185 secured to the shaft 176 which is intermittently advanced by a pawl 186 pivoted at 187 to a lever 188 rotatably mounted on the shaft 176. The lever carries a follower 189 operated by a cam surface 190 on a cam 191 carried by the shaft 94. The pawl 186 is spring pressed into engagement with the ratchet wheel 185 so that upon rotation of the shaft 94 intermittent rotation is imparted to the ratchet wheel 185 and shaft 176. The teeth on the ratchet wheel 185 are closely spaced so that intermittent motion applied to the shaft 176 is in small increments for the purpose of advancing the tins a distance equal to the width of one bob pin.

Also, mounted on the transverse shaft 176 is a second ratchet wheel 193 having widely spaced ratchet teeth 194. A lever 195 is rotatably mounted on a shaft 176 adjacent the ratchet wheel 193 and it is connected by a pivot 196 to one end of a link 197. The other end of the link 197 is pivoted at 198 to a lever 199 suitably pivoted at 200 to the supporting frame. The lever 199 also carries a cam follower 201 engaging a cam surface 202 on a cam 203 carried by the shaft 94. Thus, as the shaft 94 is rotated oscillating movement is imparted to the lever 195.

The lever 195 carries a pawl 205 by means of a pivot 206, the pawl being pressed by a spring toward the periphery of the second ratchet wheel 193. An abutment 207 operates normally to maintain the pawl 205 from engaging in the teeth 194 of the ratchet wheel. In this respect the abutment 207 is pivoted at 208 to the lever 195 and is provided with an extension extending underneath the pawl 205 for holding it out of engagement with the teeth 194. A spring 210 operates to maintain the abutment in place to render the pawl normally inoperative.

The face of the second ratchet wheel 193 is provided with an annular groove 212 for adjustably receiving a plurality of cams 213. By reason of screw and slot connections 214 the cams 213 may be adjustably positioned in the annular grooves at predetermined intervals. The cams 213 are adapted to engage the abutment 207 for moving it from underneath the pawl 205 to allow the pawl to engage a tooth 194 and imparting a large increment of movement to the ratchet wheel 193 and hence to the shaft 176.

The timing mechanism may be so arranged that recurrently eight small increments of movement are imparted to the shaft 176 and then one large increment of movement. As a result of this operation spaced groups of eight bob pins are closed upon the tins. By adjusting the cams 213 the number of bob pins in any group may be determined and also the spacing between the groups may be determined.

Figures 27, 28:
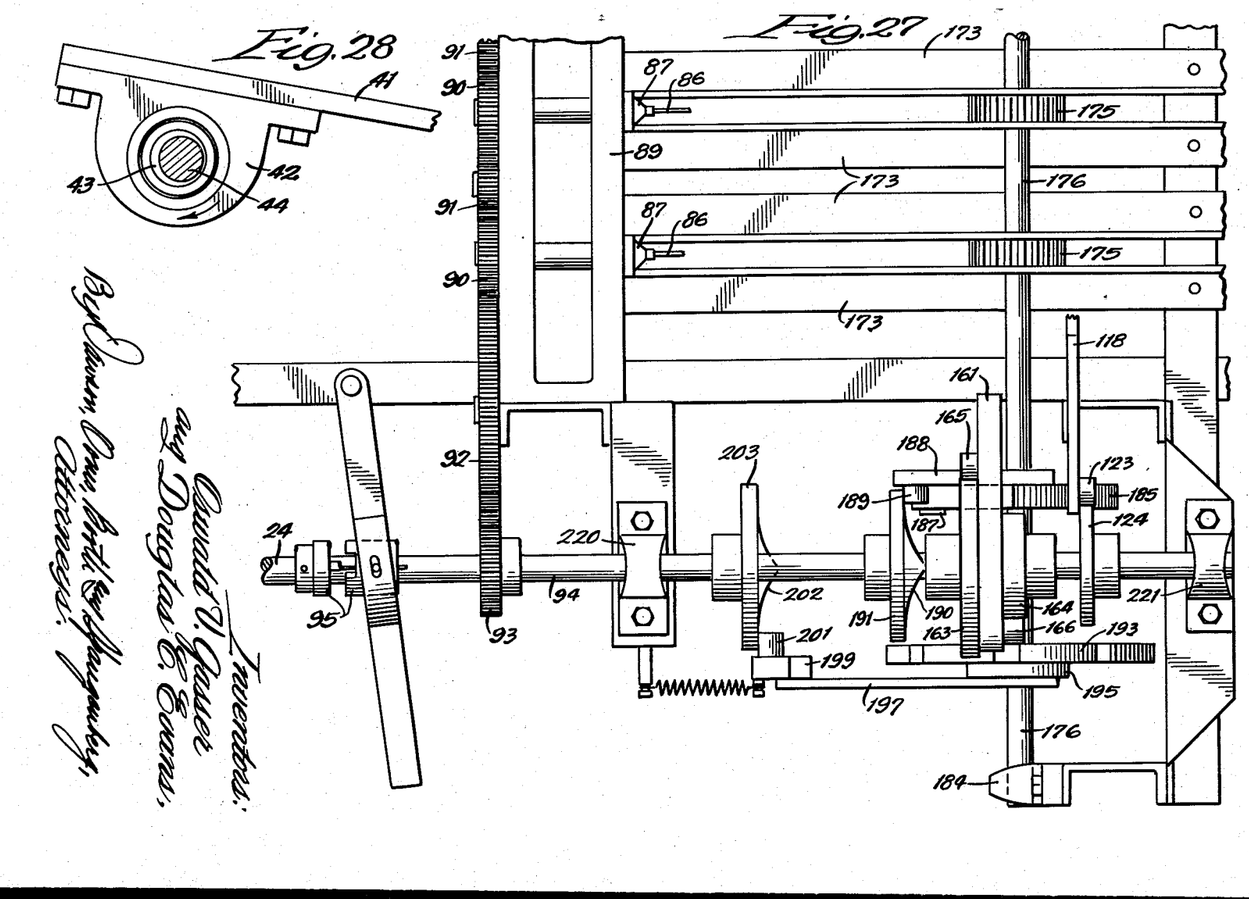
Figure 27 is a horizontal sectional view taken substantially along the line 27—27 of Figure 1.
Figure 28 is a detail view illustrating an eccentric construction.

The shaft 94 operating the timing mechanism, the screws, the gates and the closing jaws may be suitably journaled in bearings 220 and 221 carried by the supporting frame of the machine as illustrated in Fig. 27.

Figure 12:
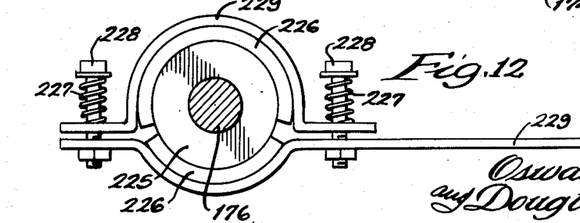
Figure 12 is a partial sectional view taken substantially along the line 12—12 of Figure 1 and illustrating a brake.

In order to prevent over-running of the intermittently operated shaft 176, it is provided with a brake (Fig. 12) having a drum 225 carried by the shaft 176 and a pair of brake shoes 226 carried by members 229. The brake shoes 226 are held against the drum by springs 227 and the retarding force of the brake may be varied by adjusting the bolts 228. One of the members 229 is extended to engage one of the cross members 13 of the supporting frame for the purpose of holding the brake mechanism stationary.

In the event that any bob pins should fall from the troughs, feed rails and arranging rails, they may be caught and collected in a suitable discharge hopper 231 carried by the supporting frame.

Occasionally some of the open bob pins fed through the bob pin machine are crooked or bent out of shape and when such bob pins are suspended by the pin 101 between the closing jaws 130 they are not accurately aligned between these jaws and hence when the jaws close the bob pins upon the tin 120, the legs of the bob pins may be offset. In other words the crooked bob pins may not be uniformly closed and secured to the tin.

Figs. 30 to 36 disclose holding fingers and the operating mechanism therefor for holding the open bob pins against the gates 108 as the closing jaws 130 operate to close the bob pins on the tin 120. The holding fingers therefore present the bob pins uniformly to the gates and closing jaws and further operate to straighten out any crooked bob pins at the time they are closed by the closing jaws. Thus, all of the bob pins are uniformly closed by the closing jaws upon the tin 120.

Figures 31, 32, 33:
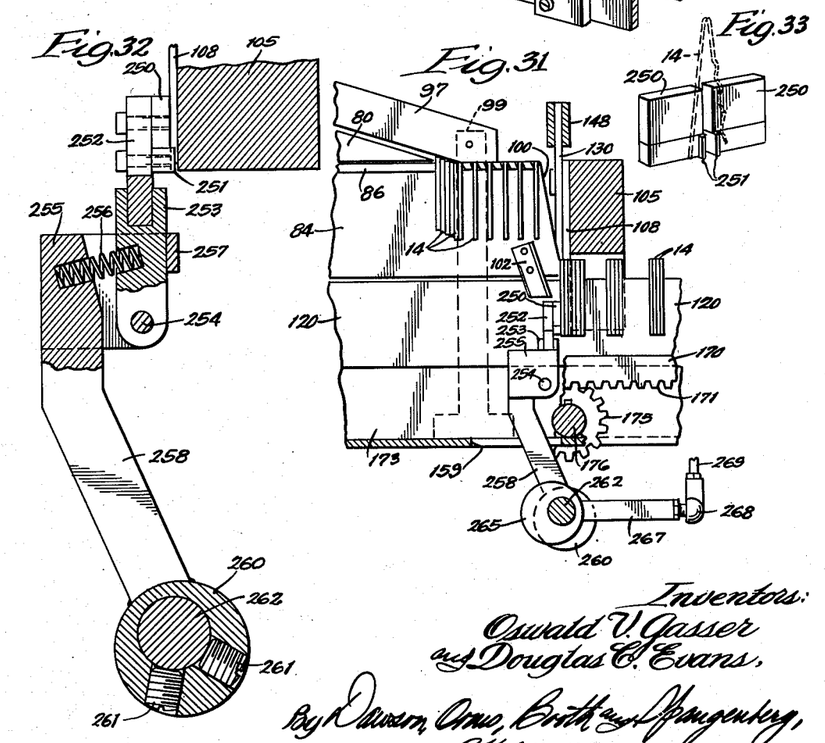
Figure 31 is a view similar to Fig. 11 showing the holding fingers in operation.
Figure 32 is an enlarged sectional view through one of the holding fingers.
Figure 33 is a partial perspective view showing the manner in which the holding fingers hold the open bob pins.
Figures 34, 35, 36:
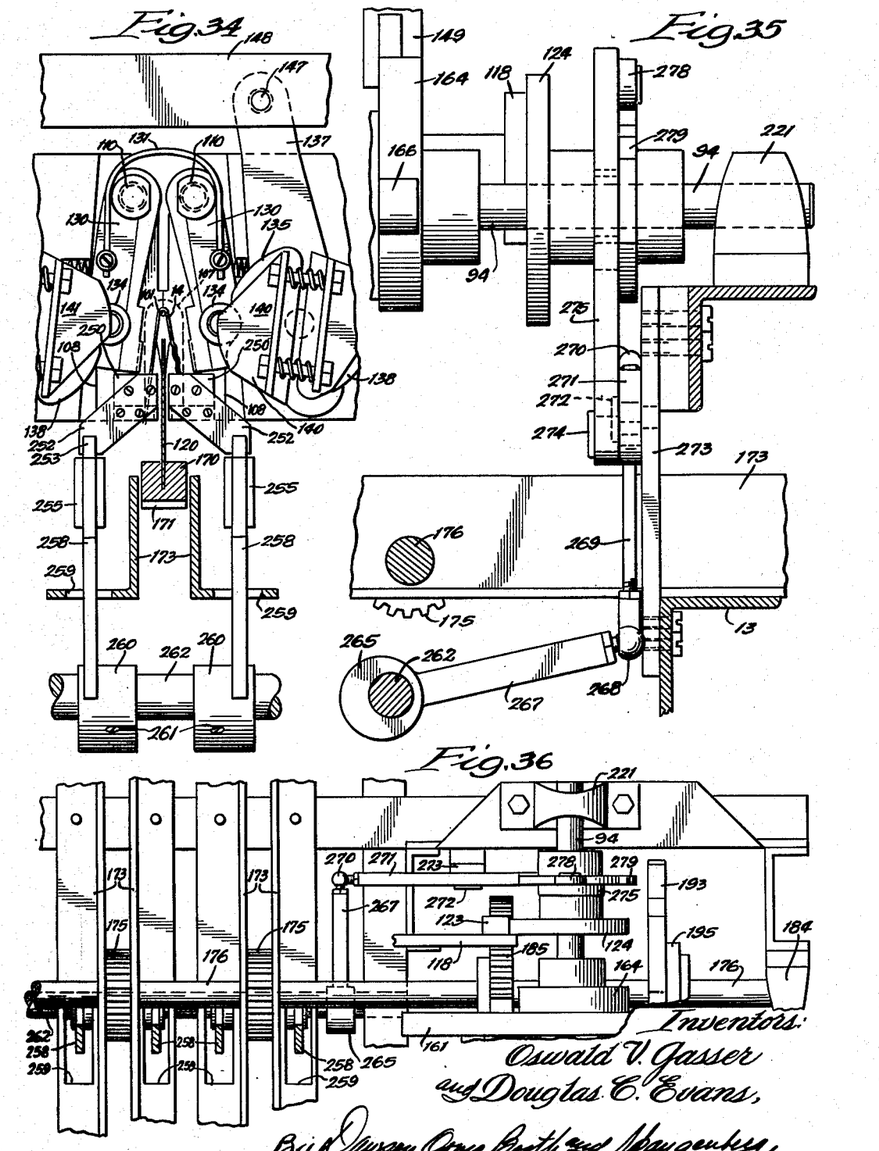
Figure 34 is a view similar to Fig. 17 showing the operation of the holding fingers.
Figure 35 is a view corresponding to Fig. 24 showing the operating mechanism for the holding fingers.
Figure 36 is a view corresponding to Fig. 27 showing the operating mechanism for the holding fingers.

A set of holding fingers is associated with each set of gates 108 and closing jaws 130, and each set of closing fingers include a pair of clamping blocks 250 having inner projections 251 as shown in Fig. 33. The faces of the blocks 250 hold the open bob pin against the faces of the closed gates 108 and the projections 251 operate to prevent either leg of the bob pin from entering between the blocks 250. The blocks 250 are carried by the arms 252 which in turn are carried by arms 253 pivoted at 254 in holders 255. Located within each holder 255 is a spring 256 for urging the arm 253 against a step 257. The spring 256 and stop 257 form a one way strain release connection so that the open bob pins are resiliently held against the faces of the gates 108.

Each holder 255 is carried by an arm 258 which extends downwardly through an opening 259 in the angle iron 173 to a hub 260 secured by set screws 261 to a transverse shaft 262. Thus, as the shaft 262 is oscillated the holding fingers are advanced toward and retracted from the gates 108.

A hub 265 secured to the shaft 262 by set screws 266 carries an arm 267 for the purpose of oscillating the shaft 262. The end of the arm 267 is connected by a ball and socket connection with one end of a link 269 and the other end of the link 269 is connected by a ball and socket connection 270 to one end of a lever 271. The lever 271 is pivoted intermediate its ends at 272 to a stationary support 273. The other end of the lever 271 is pivoted at 274 to cam follower link 275.

The cam follower link 275 is provided with a slot 276 for slidably receiving a block 277 rotatably mounted on the rotary shaft 94. The slot and block operate to guide the movements of the cam follower link 275. The other end of the cam follower link 275 is provided with a roller 278 engaging a cam 279 secured to the rotary shaft 94. A spring, not shown, maintains the roller 278 in engagement with the cam 279 and maintains the holding fingers retracted. When the high dwell 280 of the cam 279 engages the roller 278, the shaft 262 is oscillated to advance the holding fingers and when the roller 278 rides off the high dwell 280, the shaft 262 is operated to retract the holding fingers.

Preferably, the cam 279 on its advancing side is provided with an intermediate dwell 281 so that the holding fingers are advanced in two steps toward the gates 108. Thus, if any open bob pins suspended by the pin 100 are not hanging straight from the pin, the holding fingers operate to straighten out the bob pin before the gates 108 close and then after the gates are closed the holding fingers hold the open bob pin against the closed gates. Then as the closing jaws start closing the bob pin the holding fingers are retracted. In other words, the holding fingers come into operation between the steps illustrated in Figs. 19 to 21. When a bob pin is fed to the pin 101 in Fig. 19 the holding fingers partially advance to correctly locate the open bob pin on the pin 101. Then the gates 108 close. Then the holding fingers advance further to hold the bob pin against the closed gates in the position shown in Fig. 20. Then the closing jaws 130 close the bob pin and arrive at the position illustrated in Fig. 21. During this closing operation the holding fingers are retracted.

While for purposes of illustration one form of this invention has been disclosed, other forms thereof may become apparent to those skilled in the art upon reference to this disclosure, and, therefore, this invention is to be limited only by the scope of the appended claims.

We claim as our invention:

1. In a machine for manufacturing bob pins, the combination comprising a pin-receiving member generally rail-shaped and movably mounted in a generally vertical plane for longitudinal movement between a fully retracted position and a fully advanced position, means for dropping open bob pins one at a time onto said pin-receiving member with the legs of said pins straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member immediately behind said gates, and timed motor means operative sequentially to close said gates, to actuate said pin-dropping means to drop a pin on said receiving means, to close said jaws to close said pin over said receiving means, to open said gates, and to advance said receiving means by a sufficient increment to carry said closed pin beyond the rear wall of said gates.

2. In a machine for manufacturing bob pins, the combination comprising a pin-receiving member generally rail-shaped and movably mounted in a generally vertical plane for longitudinal movement between a fully retracted position and a fully advanced position, means for dropping open bob pins one at a time onto said pin-receiving member with the legs of said pins straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member immediately behind said gates, and timed motor means operative in repetitive sequence to close said gates, to actuate said pin-dropping means to drop a pin on said receiving means, to close said jaws to close said pin over said receiving means, to open said gates, and to advance said receiving means by a sufficient increment to carry said closed pin beyond the rear wall of said gates, said motor means being provided with control means operative to maintain said increment of advance at a small value for a predetermined number of cycles, thereupon on the next cycle to advance said receiving means by a larger increment of predetermined magnitude.

3. In a machine for manufacturing bob pins, the combination comprising a pin-receiving member generally rail-shaped and movably mounted in a generally vertical plane for longitudinal movement between a fully retracted position and a fully advanced position, means for dropping open bob pins one at a time onto said pin-receiving member with the legs of said pins straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member immediately behind said gates, and timed motor means operative in repetitive sequence to close said gates, to actuate said pin-dropping means to drop a pin on said receiving means, to close said jaws to close said pin over said receiving means, to open said gates, and to advance said receiving means by a sufficient increment to carry said closed pin beyond the rear wall of said gates, said motor means comprising a pair of cam-and-ratchet mechanisms, one of which is operative to advance said receiving means by a small increment and the other of which is operative to advance the same by a larger increment, blocking means operative to maintain said second cam-and-ratchet mechanism normally disabled, and cam means moving in synchronism with said receiving means operative after a predetermined number of said small incremental movements to move said blocking means and thereby to permit said second cam-and-ratchet mechanism on the next cycle to advance said receiving means by a larger increment of predetermined magnitude.

4. In a machine for manufacturing bob pins, the combination comprising means for dropping open bob pins one at a time with their respective legs pointed downward, a pin-receiving member movably mounted under said dropping means and positioned to receive said pins as they drop with the legs thereof straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member behind said gates, and timed motor means operative sequentially to close said gates, to actuate said dropping means, to actuate said closing jaws, to open said gates, and to advance said receiving means by a sufficient increment to carry said closed pin beyond the rear wall of said gates and to clear the space immediately behind said gates to receive another open bob pin.

5. In a machine for manufacturing bob pins, the combination comprising means for dropping open bob pins one at a time with their respective legs pointed downward, a pin-receiving member movably mounted under said dropping means and positioned to receive said pins as they drop with the legs thereof straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member behind said gates, retractable clamping means movably mounted behind said gates operative when advanced to engage a bob pin straddling said receiving member and to force both legs thereof against the rear wall of said gates, and timed motor means operative sequentially to close said gates, to actuate said dropping means, to advance said clamping means, pressing said bob pin against said rear wall of said gates, to actuate said closing jaws, and to retract said clamping means after said closing jaws have engaged the legs of said pin.

6. Apparatus according to claim 5 wherein said timed motor means is operative after the closing of said jaws to open the same, to open said gates, and to advance said receiving means sufficiently to carry said closed pin beyond the rear wall of said gates and to clear the space immediately behind said gates to receive another open bob pin.

7. In a machine for manufacturing bob pins, the combination comprising means for dropping open bob pins one at a time with their respective legs pointed downward, a pin-receiving member movably mounted under said dropping means and positioned to receive said pins as they drop with the legs thereof straddling said member, a pair of gates mounted athwart said pin-receiving member, said gates having an open position and a closed position, a pair of closing jaws mounted respectively on opposite sides of said receiving member immediately behind said gates and adapted when closing to engage and close onto said receiving member the legs of a bob pin straddling said receiving member behind said gates, retractable clamping means movably mounted behind said gates operative when advanced to engage a bob pin straddling said receiving member and to force both legs thereof against the rear wall of said gates, and timed motor means operative in repetitive sequence to close said gates, to actuate said dropping means, to advance said clamping means, pressing said bob pin against the rear wall of said gates, to actuate said closing jaws, to retract said clamping means after said closing jaws have engaged the legs of said pin, to open said gates after said closing jaws have closed said pin over said receiving means, and to advance said receiving means by a sufficient increment of movement to carry said closed pin beyond the rear wall of said gates, said motor means comprising a pair of cam-and-ratchet mechanisms, one of which is operative to advance said receiving means by a small increment and the other of which is operative to advance the same by a larger increment, blocking means operative to maintain said second cam-and-ratchet mechanism normally disabled, and cam means moving in synchronism with said receiving means operative after a predetermined number of said small incremental movements to move said blocking means and thereby to permit said second cam-and-ratchet mechanism on the next cycle to advance said receiving means by a larger increment of predetermined magnitude.

OSWALD V. GASSER.
DOUGLAS C. EVANS.

REFERENCES CITED

The following references are of record in the file of this patent:

UNITED STATES PATENTS

| Number | Name | Date |
| --- | --- | --- |
| 166,153 | Shelton | July 27, 1875 |
| 374,423 | Nelson | Dec. 6, 1887 |
| 683,599 | Goodfellow | Oct. 1, 1901 |
| 740,241 | Coombs | Sept. 29, 1903 |
| 969,488 | Nilson | Sept. 6, 1910 |
| 1,326,925 | Goldberg | Jan. 6, 1920 |
| 1,378,626 | Smith | May 17, 1921 |
| 1,691,516 | Glore | Nov. 13, 1928 |
| 1,988,822 | Weissenborn | Jan. 22, 1935 |
| 2,341,774 | Harris | Feb. 15, 1944 |
| 2,432,339 | Reynolds | Dec. 9, 1947 |
| 2,466,733 | Norin | Apr. 12, 1949 |
| 2,466,740 | Reynolds | Apr. 12, 1949 |